Jan. 28, 1930.  A. E. JOHNSON  1,745,169
LIVE BAIT HOLDER
Filed March 1, 1926
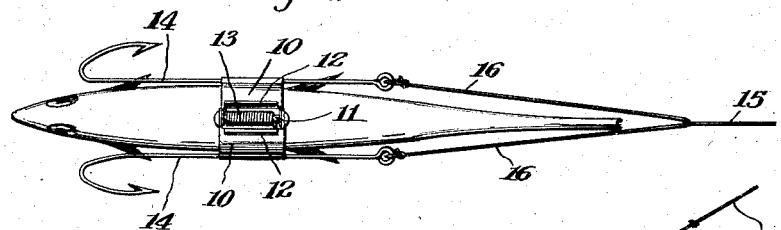
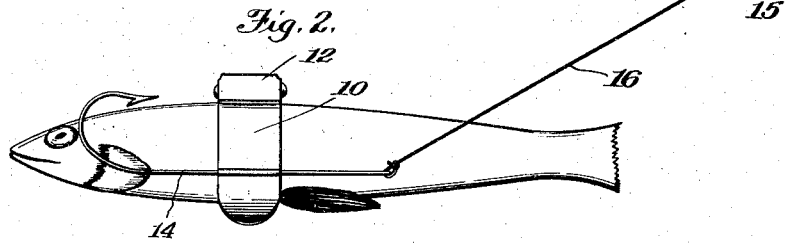
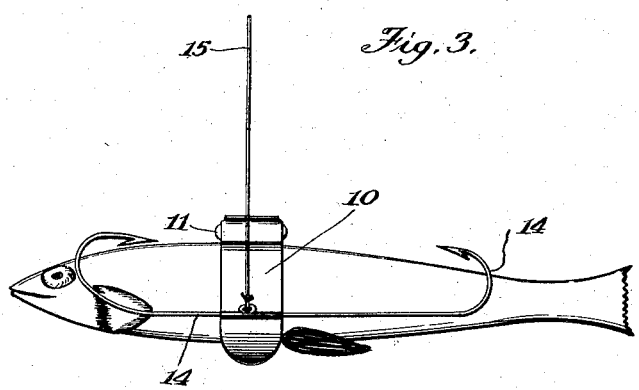
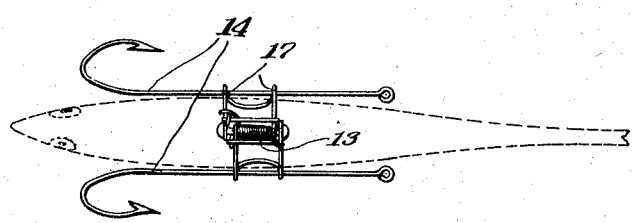

Patented Jan. 28, 1930

1,745,169

UNITED STATES PATENT OFFICE

AXEL E. JOHNSON, OF CHICAGO, ILLINOIS

LIVE-BAIT HOLDER

Application filed March 1, 1926. Serial No. 91,377.

This invention relates to a device for attaching a fish hook or hooks to a minnow or other live bait and has for its object the provision of a device of the class named which shall be of improved construction and operation; which shall securely hold the hook to the bait without injuring the live bait; which which shall be economical to manufacture and easy to apply to the bait. Other objects will appear from the following description.

The invention is exemplified in the combination and arrangement of parts shown in the accompanying drawing and described in the following specification, and it is more particularly pointed out in the appended claims.

In the drawing—

Fig. 1 is a plan view of one form of the device embodying the present invention and showing the device applied to a minnow;

Fig. 2 is a side elevation of Fig. 1;

Fig. 3 is a view similar to Fig. 2 showing a slightly modified form of the invention;

Fig. 4 is a view similar to Fig. 1 showing another form of the invention.

In the form shown in Figure 1, a pair of jaws 10 are pivotally held together by a pin 11 and are provided with upstanding extensions 12 which may be grasped between the thumb and finger of the fisherman. A spring 13 surrounds the pin 11 and resiliently closes the jaws 10. Hooks 14 are secured to the jaws 10 in position to extend along the side of the minnow with the curved portions of the hooks adjacent the head of the bait. The hooks are curved outwardly a sufficient amount to free the gills of the fish so as not to interfere with breathing. A line 15 is provided with branches 16, one of which is attached to each of the hooks 14. The jaws 10 are preferably made of material that can be shaped to fit the contour of the particular form of bait used. Thin, sheet brass or copper may be used for this purpose although other material, of course, may be substituted. Sufficient pressure is exerted by the spring 13 to hold the clamp in place about the fish, and, since the clamp is applied at the central portion of the fish's body, the body will be sufficiently compressed to prevent displacement of the clamp without injury to the fish and without in any way interfering with the free movement of the fish in the water.

A large fish when seizing a minnow usually strikes from the front so that the position of the hooks adjacent the fish's head insures hooking the fish in case of a strike. The line is located sufficiently to the rear of the hooks not to interfere with hooking the fish. The device is quickly and easily applied to the bait by grasping the extensions 12 between the thumb and finger so as to spread the jaws 10 and then slipping the jaws over the minnow. Usually this can be done while the minnow remains in the water in the bait bucket without even grasping the minnow in the hand, if caution is used in approaching the minnow with the bait holder.

Another way to apply the holder is to place one hand beneath the minnow to prevent the escape of the minnow while the holder is applied with the other hand. This may be done entirely under water. The ease with which the device is applied prevents the necessity of keeping the minnow out of water for any considerable period of time so that the least possible harm is shown to the live bait. In practice, it has been found that the bait will remain alive and active in the water for hours with the holder applied thereto. The free, natural movement of the bait permitted by the holder has been found to be effective in attracting game fish while the restraint imposed by the line is just sufficient to restrict the movement of the bait and enough to lure the fish.

For some species of fish, and for some modes of fishing, it may be desirable to have a hook at both ends of the bait. This may be done as illustrated in Figure 3, by providing a double hook attached to each of the clamping jaws 10. Where this arrangement is used, the line 15 may be secured to the hooks adjacent the clamp 10, as illustrated in Fig. 3.

In the form of the invention shown in Figure 4, the clamping jaws 17 are similar to the jaws 10 except that they are made of wire bent into the proper shape, instead of sheet metal. In other respects, the device shown in Figure 4 is similar to that shown in Figures 1 and 2.

I claim:

1. In a bait holder, the combination with a pair of pivoted jaws for encircling the bait, of a spring for urging said jaws toward each other, hooks on said jaws and extending transversely thereof, and means on each of said hooks remote from said jaws to which different branches of a branch line may be secured.

2. A bait holder comprising spring-pressed clamping members pivoted to each other adjacent one end of each of said members, means for releasing the clamping pressure of said clamping members, a fish hook attached to each of said members, and means remote from the clamping members to which the opposite branches of a branch line may be attached for supporting the bait.

3. A bait holder comprising spring-pressed clamping members pivoted to each other and arranged to surround the bait near its middle, hooks on said clamping members extending in opposite directions therefrom so that some of said hooks are positioned near the one end and others thereof are positioned near the opposite end of the bait, and means to which the opposite ends of a branch line may be secured to support the bait holder.

4. A live bait holder comprising a pair of pivoted jaws pivoted to each other, a spring for urging said jaws toward each other, a finger-piece on each of said jaws adapted to be operated so as to move said jaws against the action of the springs, hooks on said jaws remote from the pivotal connection between said jaws, and means remote from the clamp to which the branches of a branch line may be connected.

5. A live bait holder comprising a pair of pivoted jaws pivoted to each other, a spring for urging said jaws toward each other, a finger-piece on each of said jaws adapted to be operated so as to move said jaws against the action of the springs, hooks on said jaws remote from the pivotal connection between said jaws, and means remote from the clamp to which the branches of a branch line may be connected, said pivoted jaws being made of deformable material.

In testimony whereof I have signed my name to this specification on this 27th day of February, A. D. 1926.

AXEL E. JOHNSON.